(12) United States Patent
Hurst

(10) Patent No.: US 9,160,903 B2
(45) Date of Patent: Oct. 13, 2015

(54) CAMCORDER AIMING DEVICE

(76) Inventor: John Drew Hurst, Wake Forest, NC (US)

(*) Notice: Subject to any disclaimer, the term of this patent is extended or adjusted under 35 U.S.C. 154(b) by 216 days.

(21) Appl. No.: 13/420,889

(22) Filed: Mar. 15, 2012

(65) Prior Publication Data

US 2012/0169912 A1  Jul. 5, 2012

Related U.S. Application Data

(63) Continuation-in-part of application No. 12/102,001, filed on Apr. 13, 2008, now abandoned, which is a continuation-in-part of application No. 12/027,257, filed on Feb. 6, 2008, now abandoned.

(51) Int. Cl.
H04N 5/225 (2006.01)
G03B 13/04 (2006.01)
G03B 17/56 (2006.01)

(52) U.S. Cl.
CPC .............. H04N 5/2251 (2013.01); G03B 13/04 (2013.01); G03B 17/568 (2013.01)

(58) Field of Classification Search
CPC ....................................................... H04N 5/225
USPC ................................ 348/207.99, 373–375, 81
See application file for complete search history.

(56) References Cited

U.S. PATENT DOCUMENTS

| 3,212,422 | A | * | 10/1965 | Nerwin et al. ................... 396/84 |
| 5,099,265 | A | | 3/1992 | Lee |
| 5,801,774 | A | | 9/1998 | Seo |
| 5,859,665 | A | | 1/1999 | Hibi |
| 7,042,660 | B2 | | 5/2006 | Sugita et al. |
| 2006/0181636 | A1 | | 8/2006 | Tokura et al. |
| 2007/0019098 | A1 | | 1/2007 | Senba et al. |

FOREIGN PATENT DOCUMENTS

JP  2001142107 A  5/2001

OTHER PUBLICATIONS

ReefMaster Digital Instruction Manual published on Nov. 19, 2001.*
Seelife SL 545 SportDiver II compact 35mm Underwater Camera published on Aug. 2, 2006.*
SeaLife, SportDiverII, Underwater Film Camera, http://www.sealife-cameras.com/cameras/sportdiver.html, dated Feb. 18, 2008.

* cited by examiner

*Primary Examiner* — Tuan Ho
(74) *Attorney, Agent, or Firm* — James G. Passé; Passé Intellectual Property, LLC

(57) ABSTRACT

The present invention relates to an aiming device for a camcorder. An open frame with an attachment means is mounted to the camcorder such that one can see what the camcorder will record through the open frame yet still view the non recorded material at the same time.

7 Claims, 9 Drawing Sheets

CAMCORDER AIMING DEVICE

RELATED APPLICATION

This application is a continuation-in-part of application Ser. No. 12/102,001 filed on Apr. 13, 2008 now abandoned which is a continuation-in-part of application Ser. No. 12/027,257 filed on Feb. 6, 2008 now abandoned.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a device for aiming a camcorder. In particular the present invention relates to a device which can be attached to a camcorder and used to aim the camcorder while continuing to observe the action being recorded.

2. Description of Related Art

With the introduction of digital camcorders, their ease of use and cost effective price, we now see these devices almost everywhere. These new devices are designed for the average user and hence have concentrated on being user friendly. A trip to a local youth soccer game will quickly show the ubiquity of these devices.

Aiming the camcorder, that is the framing of the view that will appear on the finished video, is classically done by one of two means. Aiming is conventionally accomplished with use of either an electronic or optical viewfinder. An electronic viewfinder produces a digital image on a screen much like the finished video product and it is not uncommon to currently see two to three inch LCD screens for viewing the action as it is recorded. The alternative is the older optical system, where, through a series of optical lenses an approximation or actual view through the lens is accomplished to indicate the framing of what is being recorded. In U.S. Pat. No. 5,099,265 issued Mar. 24, 1992 to Lee, a combination optical and electronic viewfinder is provided which gives the user the option of which system to use with one device. Many camcorders have both devices as separate viewfinding devices.

A problem with viewfinders in general is that the image is so small on the viewfinder that while it is possible to frame the action while filming, it is virtually impossible to actually watch the action going on while filming it. Watching a youth soccer game and recording it at the same time can be extraordinarily frustrating if not impossible.

BRIEF SUMMARY OF THE INVENTION

It has been discovered that by positioning an open framed aiming device on a camcorder the open frame can be sighted through or aimed through such that the view through the open frame is essentially the same as the camcorder will film and thus allow the user to film, aim and continue to watch the scene being filmed as well as the adjoining scene not being filmed. With the present device there is no need to use electronic or optical view-finders which make watching the scene being filmed almost impossible.

Accordingly, one embodiment of the present invention is a camcorder aiming device comprising an open rectangular frame with a camcorder attachment means for removably attaching the device to a camcorder in a position such that upon aiming through the open device one can see essentially what the camcorder will film.

Another embodiment of the invention is a camcorder having a camcorder aiming device attached thereto comprising an open rectangular frame attached to the camcorder in a position such that upon aiming through the open device one can see what the camcorder will film.

These and other objects of the present invention will be clear when taken in view of the detailed specification and disclosure in conjunction with the appended figures. Nothing in the drawings is intended to be limiting and the full scope of the invention is to be interpreted in view of the claims and the specification as further disclosed herein.

DETAILED DESCRIPTION OF THE INVENTION

Figure 1:
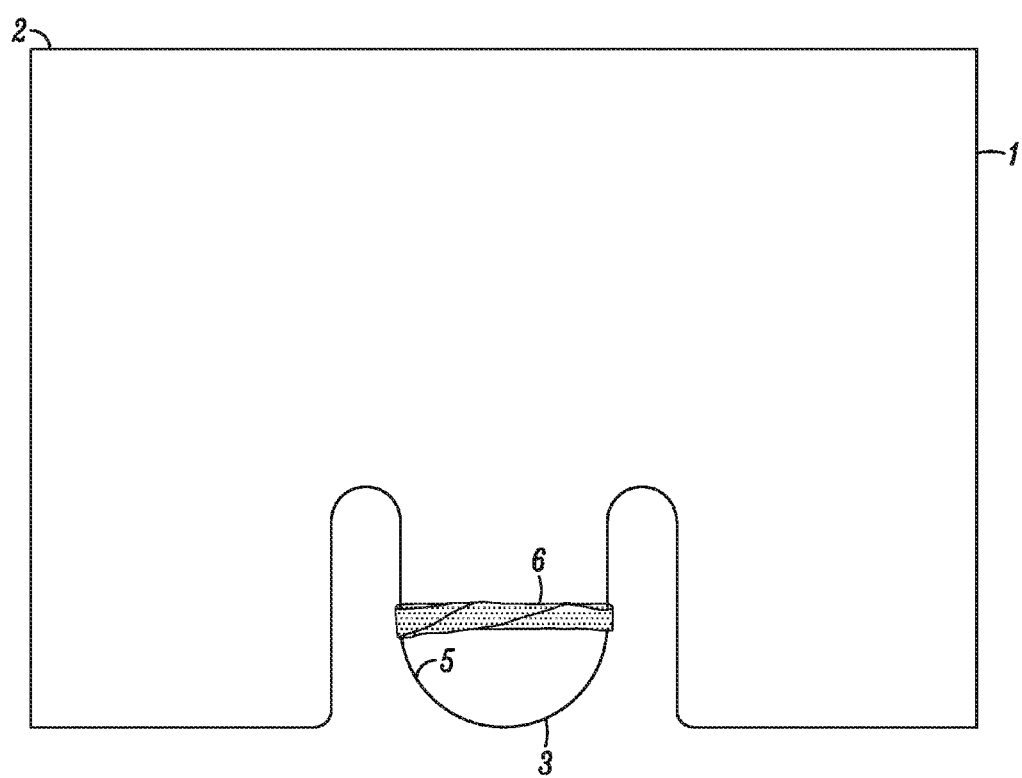
FIG. 1 is a front perspective view of the present invention with an around the lens attachment means.

It has been discovered that by mounting a framing device on the camcorder lens or body and positioning one's self at the proper distance that the view through the open frame is essentially the same as the view in the camcorder viewfinder. By aiming the camcorder using the aiming device, the camcorder user cannot only aim the camcorder but view the video and the surrounding action at the same time in real life time and not in a tiny viewfinder.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "about" and "essentially" near ±10 percent.

The terms "a" or "an", as used herein, are defined as one as or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

As used herein the term camcorder, refers to small handheld digital type video recording devices designed essentially for video and possibly still photography. These camcorders consist of a centered lens that is either fixed frame or has either optical or digital zoom. Typically camcorders are fitted with both a screen LCD viewfinder as well as some form of optical lens (either through the lens or not) viewfinding system. These focusing and aiming devices require looking at a very small picture such that detail is almost impossible to discern and it is almost impossible to not have to constantly look up and back causing very jerky video recordings and making it almost impossible to film a live action event. The current camcorders record a rectangular picture usually in either a 4:3 format or 16:9 format.

As used herein an "aiming" device refers to a means for determining what is being shot on the video in a camcorder in terms of what is in the recording and what is not. Also called a framing device, the viewfinder of the camcorder is one means of aiming the camcorder and seeing exactly what the camcorder will be or is recording.

As used herein "open frame" refers to a see through frame made of bent wire, plastic, wood, alloy, carbon resin, laminate, a composite or the like that is shaped proportional to the video picture. The frame can be an entire shape or partially open for example as uprights with an open top. In one embodiment the frame is a rectangle but in other embodiments the frame can be square, circular, oval, trapezoidal, diamond or the like as desired. Where the camcorder has a zoom lens on it, there can be one open frame corresponding to the widest angle and another open frame positioned concentric with the larger open frame representing the relationship in sizes for zooming in all the way. In other words, one would aim with the larger frame in wide angle mode and the concentric frame for zoomed in mode. There could be a plurality of concentric open frames in one embodiment in a sort of bull's eye dart board configuration. The exact size can easily be determined from the disclosure herein; however, in one embodiment the frame is as small as three inches across by two inches or as large as twelve inches across. Manufacture of the device of the present invention is within the skill in the art with the disclosure of the invention in front of them. For example, wire frame devices can be made of stiff wire and bent to shape using conventional means.

The present invention open frame is attached to a camcorder such that when sighting across the top of the camcorder or at about the level of the camcorder lens, one will be looking through the open frame. The general positioning can be seen further in examples of the appended figures. One skilled in the art can build a frame for attachment in view of the disclosure herein. The device is attached (in one embodiment removably) to the camcorder by attachment to the lens or to the camera body. The lens attachment can be by any convenient means such as clips, framing material, elastic means, Velcro type hook and loop devices, screw on means or the like. The present invention device can also be attached to the body in similar means. One embodiment for an attachment means is to provide a hot shoe attachment means such that the devices slips in removably to the hot shoe attachment if any in the camcorder. In yet another embodiment of the present invention there is an attachment means wherein the present invention screws into the camcorder lens filter threading or onto a filter screwed onto the lens. In yet another embodiment there is an attachment means wherein the device attaches to the tripod mount on the bottom of a camcorder.

In one specific embodiment of the present invention, the device of the present invention is removably attached and in yet another embodiment, the device is not removably attached.

Now referring to the drawings, FIG. 1 depicts a frontal perspective of an embodiment of the present invention. The aiming device 1 consists of rectangular frame 2. Although as discussed above different geometrical shapes can be employed. The frame in this embodiment is depicted as a bent wire but as described above can be made of any material that achieves the open frame configuration. As can be seen in the drawing one can easily see through this open wire frame 2.

Figure 4:
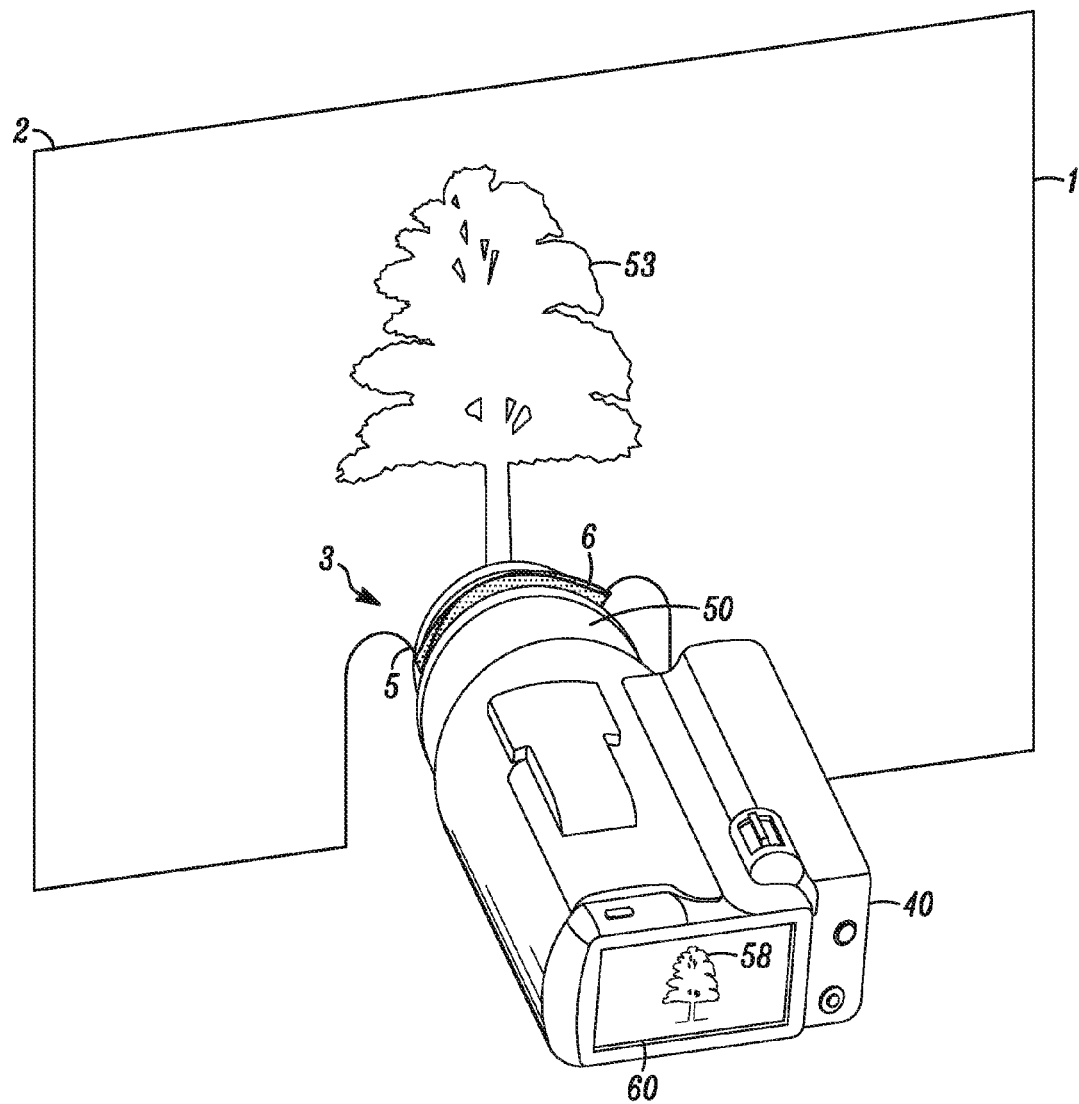
FIG. 4 is an angle rear perspective of the present invention mounted to the lens of a camcorder.
Figure 5:
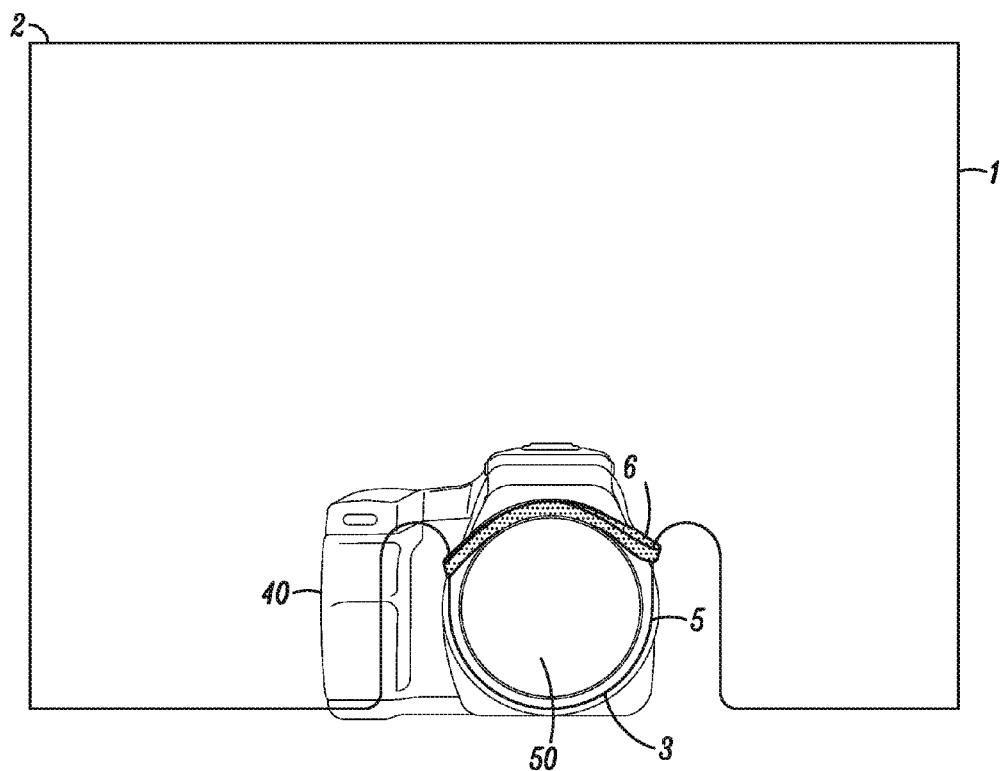
FIG. 5 is a front perspective of the present invention mounted to the lens of a camcorder.

Attachment means 3 to attach the aiming device 1 to a camcorder is depicted in this embodiment as the bent wire lens attachment 5 and elastic means 6. The elastic means such as an elastic strap rubber band or the like holds the wire in place as can be seen in FIGS. 4 and 5. The bent wire 5 portion fits around the lower portion of a camcorder lens and the elastic means 6 around the top of the lens in a tight manner such that the aiming device 1 is held in place essentially perpendicular to the sight line of the camcorder lens. As can be seen in this FIG. 1 the frame 2 has a portion of the frame 2 that will be positioned below the level of the lens.

Figure 2:
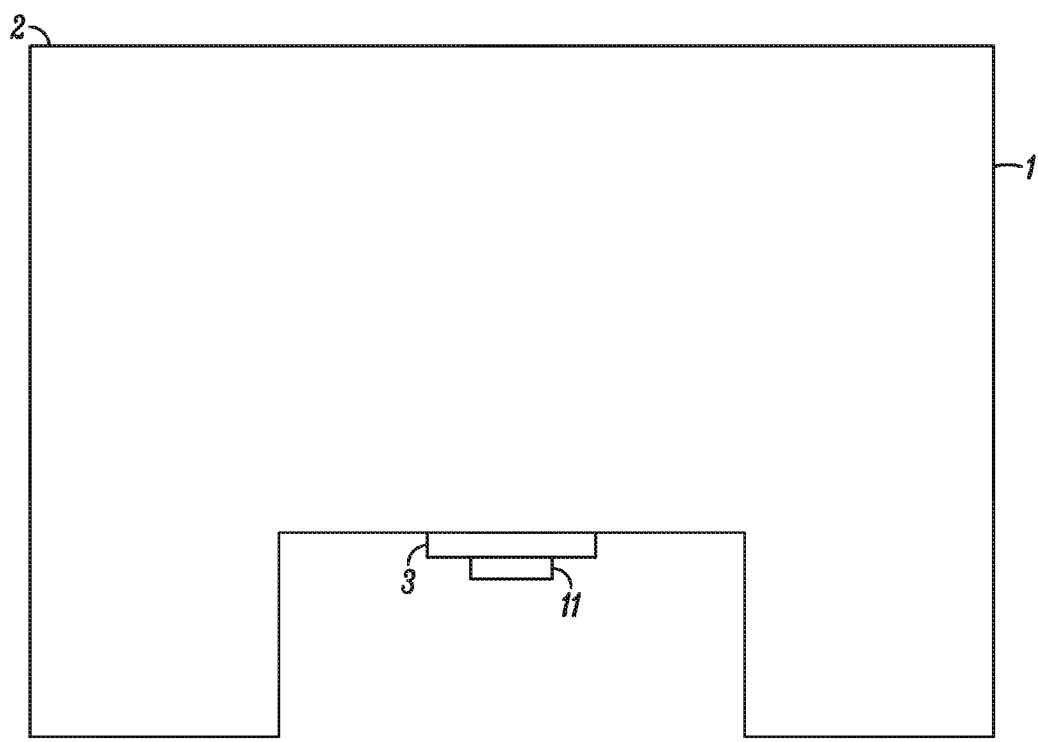
FIG. 2 is a front perspective view of the present invention with a hot shoe on camcorder body attachment means.

In FIG. 2 there is depicted an alternate frontal perspective view of the present invention. In this embodiment the aiming device 1 is once again a wire frame 2. However, the camcorder attachment means 3 is a hot shoe attachment means 11. This hot shoe attachment means 11 is designed to attach the device 1 by mounting in the hot shoe adaptor in a camcorder if one exists.

Figure 3:
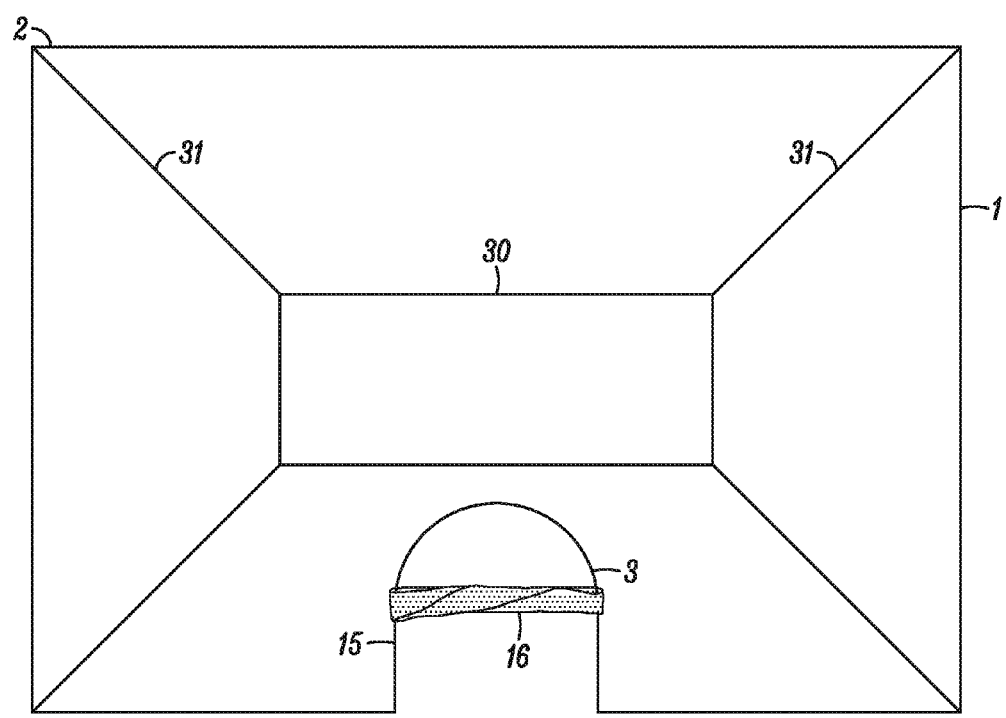
FIG. 3 is a front perspective view of the present invention with wide angle and zoom aiming and lens attachment means.

FIG. 3 is yet another frontal embodiment of the present invention. In this view the aiming device 1 consists of a wire frame 2 which corresponds to aim a camcorder in wide angle mode and an inner wire frame 30, designed to aim the camcorder view when the camcorder is fully zoomed in. The inner wire frame 30 is suspended concentric to the wire frame 2 by connecting threads 31. By sighting through the appropriate frame one can aim in the wide angle or zoomed in mode for zoomed positions in between those two, one could approximate the aiming frame relative to the two that exist or in alternate embodiments multiple concentric frames similar to frame 30 could be employed.

In FIG. 3 yet another attachment means 3 is depicted. In this embodiment a top bent wire 15 is employed with a lower elastic 16 to hold the device 1 firmly onto a camcorder lens.

In FIG. 4 there is a rear perspective view of an embodiment of the present invention attached to a camcorder 40. Depicted is a removably attached device 1; however, this figure could also represent the non-removably attachment means. In this view the device 1 consists of the same type of device 1 as depicted in FIG. 1. The wire frame 2 is positioned around the lens 50 of camcorder 40. The device attachment means 3 consisting of the bent wire 5 and elastic 6 is shown wrapped around lens 50. As can be seen in this depiction, the view of tree 53 is similar to the view of the tree 58 in LCD viewfinder 60. However watching the tree 53 through device 1 allows someone to watch activity outside of the frame 2 at the same time as watching what is inside frame 2.

FIG. 5 is a view of the present device giving a front perspective of the present invention attached to a camcorder. The aiming device 1 consisting of frame 2 is the same device 1 shown in FIG. 4 but from the front. The camcorder lens 50 can be seen from the front of camcorder 40. The attachment means 3 consisting of the bent wire 5 and elastic 6 are also shown. As can be seen the attachment means 3 surrounds the lens 50 such that the frame 2 is held in place on camcorder 40.

Figure 6:
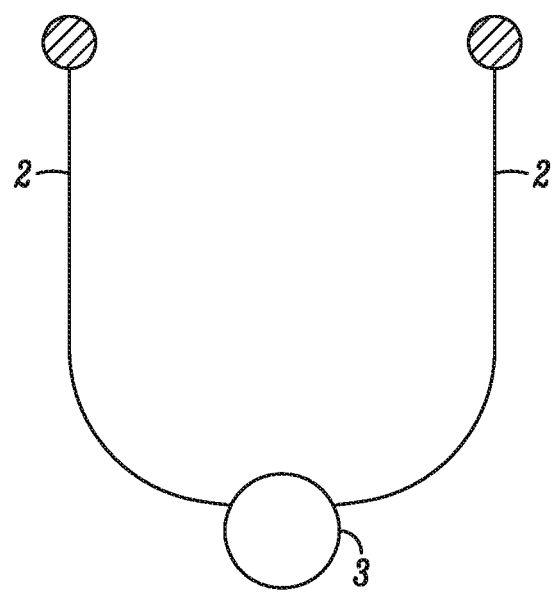
FIG. 6 is a front view of an embodiment which attaches to the lens and is not a completely enclosed rectangle.

FIG. 6 is another frontal view embodiment of device 1 where the frame is not completely closed. The U shaped frame in this embodiment has camcorder attachment means 3 wherein it can screw onto the lens or a lens cover via a threaded means. As can be seen from this embodiment the aiming device is designed to generally outline the view being shot. Parts of the frame 2 can be omitted and one can still use the device to aim.

Figure 7:
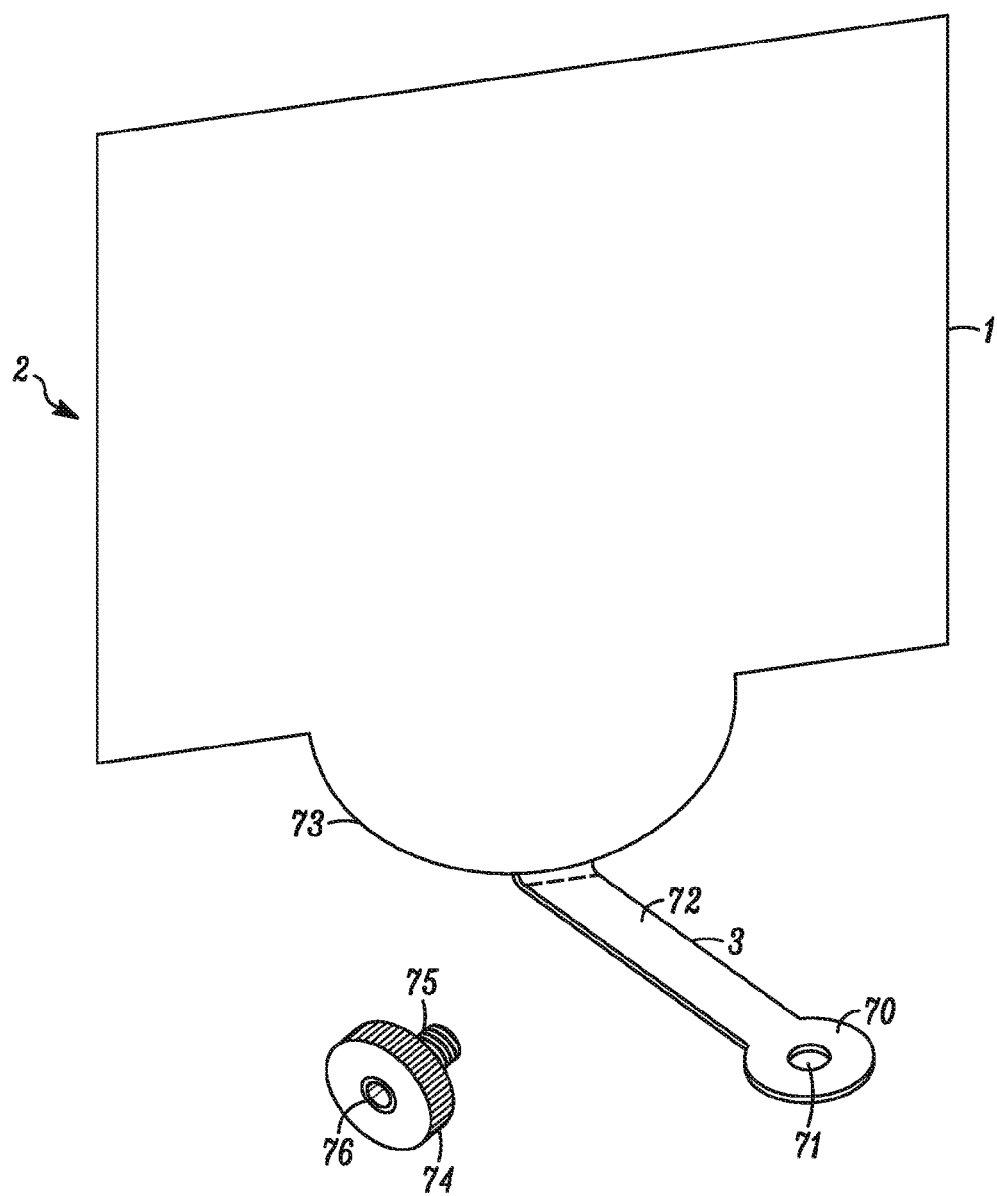
FIG. 7 is a perspective view of an embodiment which attaches to the tripod mount.

Yet another embodiment wherein the device is attached to the body of the camera as shown in FIG. 7. The aiming device 1 consists of frame 2 and body attachment means 3. The wire frame 2 has lens curvature 73 so that the frame does not interfere with or touch a camcorder lens as is the case with the previous embodiment. The camcorder attachment means 3 consists of arm 72 which positions the frame in the proper position relative to the mounting hole and camera lens and body. Its length can be either fixed as shown but in other embodiments its length is adjustable to account for different camcorders and their particular design. In yet other embodiments it's adjustable by otherwise flexing to adapt to offset adaptor mounts. Tripod mount 70 has tripod mount hole 71. A tripod mount screw 74 has its screw 75 passed through hole 71 wherein it can be screwed into the tripod mount screw hole that is present on virtually all camcorders. The screw 74 also has a tripod mount so that during use of the aiming device 1 mounted in this manner the camcorder can still be mounted on a tripod. This embodiment is used in the same manner as the other embodiments.

Figure 8:
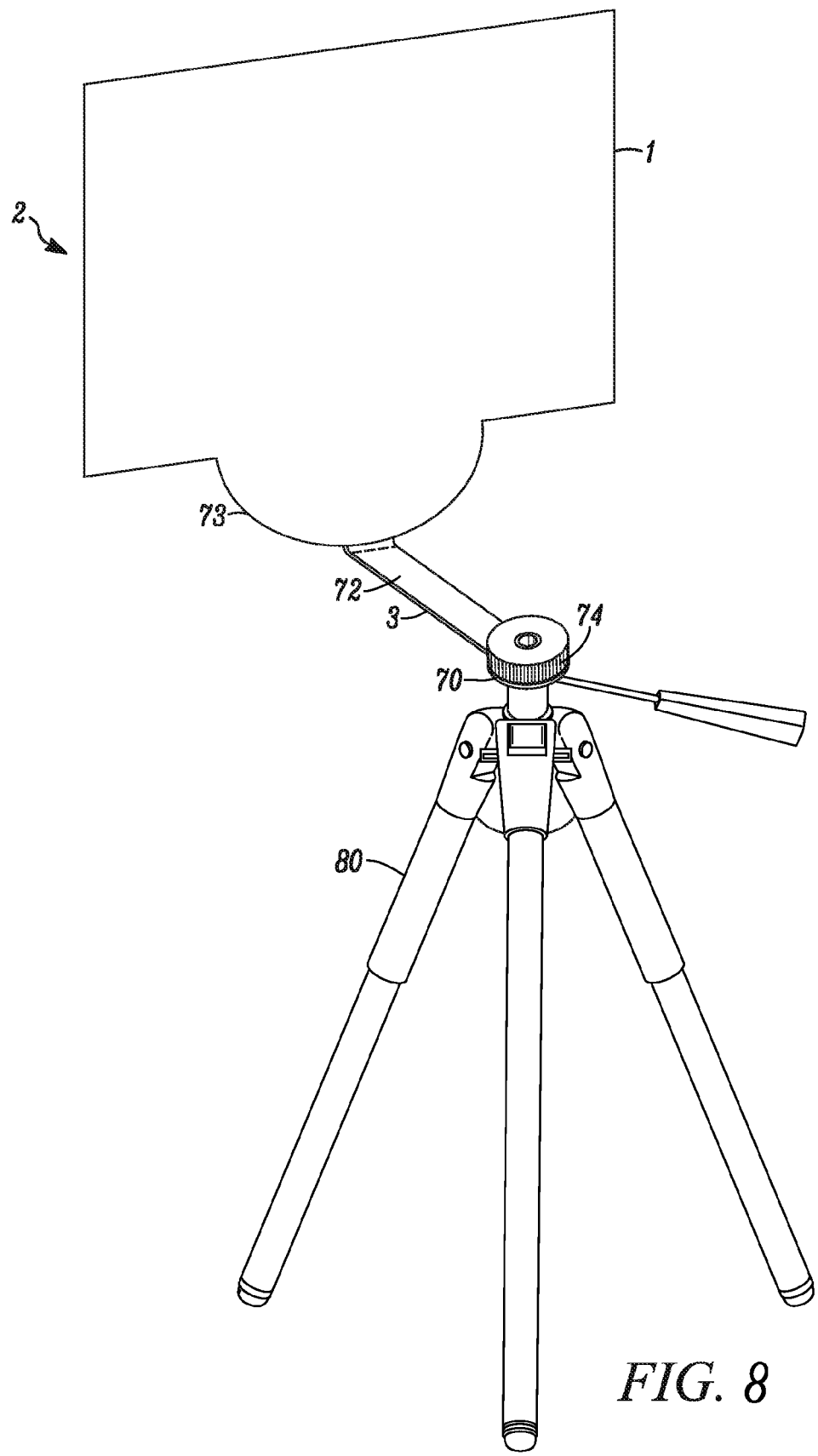
FIG. 8 is a perspective of the device attached to a camcorder tripod.

FIG. 8 shows a perspective of the device shown in FIG. 1 attached to a tripod 80 ready to accept a camcorder.

Figure 9:
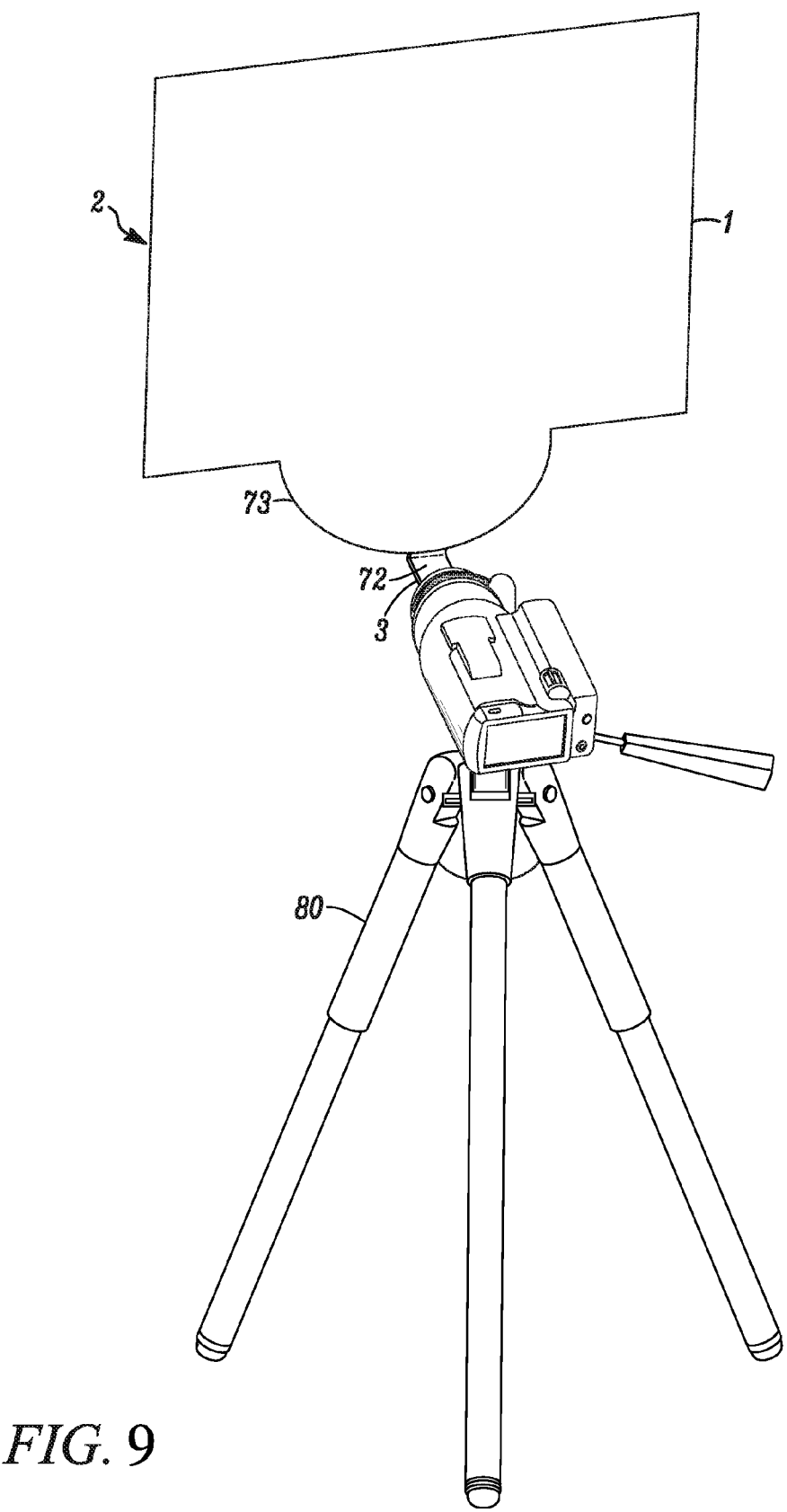
FIG. 9 is a perspective of the device in FIG. 8 with camcorder attached.

FIG. 9 shows a perspective of the device in FIG. 8 with camcorder attached.

EXAMPLE 1

An aiming device was made as follows: a piece of wire was bent into the shape shown in FIG. 1. The wire was approximately an eighth inch and the frame was approximately 7 inches across and 5 inches high. A rubber band was added as the elastomeric means to hold the device on a camcorder. A JVC GZ-MC500U Digital camcorder having a lens approximately 1.5 inches across was selected (and depicted as the camcorder in FIGS. 4 and 5). The Frame was fitted on the camera using the attachment means with the rubber band on top of the lens. By holding the camcorder with the frame approximately 12 inches from the eyes and sighting across the top of the camcorder the view in the frame is approximately the same as on the camcorder's LCD viewfinder. However the LCD screen is so small that details of what is being filmed are not able to be readily discerned and one must take their eyes off of what is being filmed to do so. With the aiming device of the present invention, the filming could be done while watching what is being filmed and the action around the area being filmed. In an attempt to film multiple balls being thrown it was impossible to follow the action and film using the LCD screen while with the present invention device an eye could easily be kept on the action filmed as well as the successive balls being thrown in the present example filming.

EXAMPLE 2

A device made according to FIG. 7 is fashioned out of stamped steel or any suitable material. The device is mounted on the screw tripod mount of the camcorder described in Example 1. This embodiment of the present invention then does not touch the lens or any active part of the camcorder during camcorder use.

What is claimed is:

1. A camcorder aiming device for use by an individual with a camcorder having a lens with a sight line and a view finder, the aiming device comprising:
   a) a frame having an open portion that can be looked through by the individual, wherein the camcorder lens is positioned in one of either a) inside the open portion of the frame or b) such that the lens sight line is through the open portion of the frame and positioned essentially perpendicular to the sight line of the lens; and
   b) a camcorder attachment means for removably attaching the device to the camcorder wherein the open frame is in a position on the camcorder such that upon the individual looking across the top of the camcorder and through the open frame and not through the camcorder lens or viewfinder one can see essentially what the camcorder will film through the lens.

2. A camcorder device according to claim 1 wherein there is at least one additional concentric frame within the frame designed to aim a camcorder with a camera zoom.

3. A camcorder aiming device according to claim 1 wherein the attachment means is designed for attachment to a camcorder lens.

4. A camcorder according to claim 1 wherein the aiming device is attached to a camcorder tripod mount.

5. A camcorder aiming device according to claim 4 wherein the aiming device is mounted on a tripod.

6. A camcorder aiming device according to claim 1 which is mounted on a camcorder.

7. A camcorder aiming device according to claim 1 wherein the lens is located inside the open portion of the frame.

* * * * *